(12) United States Patent
Fleming et al.

(10) Patent No.: US 8,352,770 B2
(45) Date of Patent: Jan. 8, 2013

(54) METHOD, SYSTEM AND APPARATUS FOR LOW-POWER STORAGE OF PROCESSOR CONTEXT INFORMATION

(75) Inventors: Bruce L. Fleming, Morgan Hill, CA (US); Ashish V. Choubal, Austin, TX (US); Sanjoy K. Mondal, Austin, TX (US); Belliappa M. Kuttanna, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 12/567,707

(22) Filed: Sep. 25, 2009

(65) Prior Publication Data
US 2011/0078463 A1 Mar. 31, 2011

(51) Int. Cl.
*G06F 1/00* (2006.01)
(52) U.S. Cl. .................. 713/324; 713/300; 713/320
(58) Field of Classification Search .................. 713/300, 713/320, 324
See application file for complete search history.

(56) References Cited

U.S. PATENT DOCUMENTS

| | | | |
|---|---|---|---|
| 5,784,628 A * | 7/1998 | Reneris | 713/300 |
| 6,795,896 B1 * | 9/2004 | Hart et al. | 711/118 |
| 6,968,469 B1 * | 11/2005 | Fleischmann et al. | 713/324 |
| 7,664,970 B2 * | 2/2010 | Jahagirdar et al. | 713/300 |
| 8,086,883 B2 * | 12/2011 | Axford et al. | 713/320 |
| 2003/0101362 A1 * | 5/2003 | Dia | 713/300 |
| 2005/0283628 A1 * | 12/2005 | Youngs | 713/300 |
| 2006/0143485 A1 * | 6/2006 | Naveh et al. | 713/320 |
| 2009/0292934 A1 * | 11/2009 | Esliger | 713/323 |
| 2009/0327553 A1 * | 12/2009 | Fletcher | 710/262 |
| 2011/0078463 A1 * | 3/2011 | Fleming et al. | 713/300 |
| 2011/0231681 A1 * | 9/2011 | Allarey et al. | 713/310 |

\* cited by examiner

*Primary Examiner* — Jaweed A Abbaszadeh
(74) *Attorney, Agent, or Firm* — Blakely, Sokoloff, Taylor & Zafman LLP (57) ABSTRACT

A method and system for saving and/or retrieving context information of a processor core for a power state transition. The processor core resides in a complex power domain variously transitioning between a plurality of power states. The processor core includes a local context storage area for storage and retrieval of processor core context information. A low power context storage resides in a nominal power domain external to the complex power domain. Context information of the processor core is stored to the low power context storage based on whether a power state transition of the complex power domain includes a transition to power down the processor core.

18 Claims, 6 Drawing Sheets

METHOD, SYSTEM AND APPARATUS FOR LOW-POWER STORAGE OF PROCESSOR CONTEXT INFORMATION

BACKGROUND

1. Technical Field

Embodiments of the present invention relate generally to data processing. More particularly, embodiments relate to techniques for saving and/or retrieving context information of a processor core for a power state transition associated with the processor core.

2. Background Art

Processor devices on high-availability platforms, such as those used for Mobile Internet Device (MID) applications, must support "always-on" modes of operation. Always on modes of operation are generally characterized by low latency entry to and/or exit from very low power states on the platform while maintaining an operating system (OS) context and external connectivity. In order to reach very low power states from a platform perspective, most processor device blocks are typically powered off and state is typically retained either in hardware (HW) or by software (SW) interaction. Such processor device blocks can include one or more cores of a processor—e.g. a central processing unit (CPU) on the platform.

CPU context information is often retained in CPU cache—e.g. a L2 cache of a processor core which is dedicated to operate as a context storage SRAM. However, leakage associated with such volatile local CPU storage often makes it infeasible to retain this state during low power modes. However, not retaining CPU context information in HW has an adverse effect on exit from these low power states. Alternatives to HW typically require SW to save and restore architectural and/or micro-architectural state, which increases exit latency. Since processor core state restoration operates at a much higher power level than standby, an increase of 1 ms in serialized exit latency can decrease battery life, e.g. by ~8%, in some circumstances.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
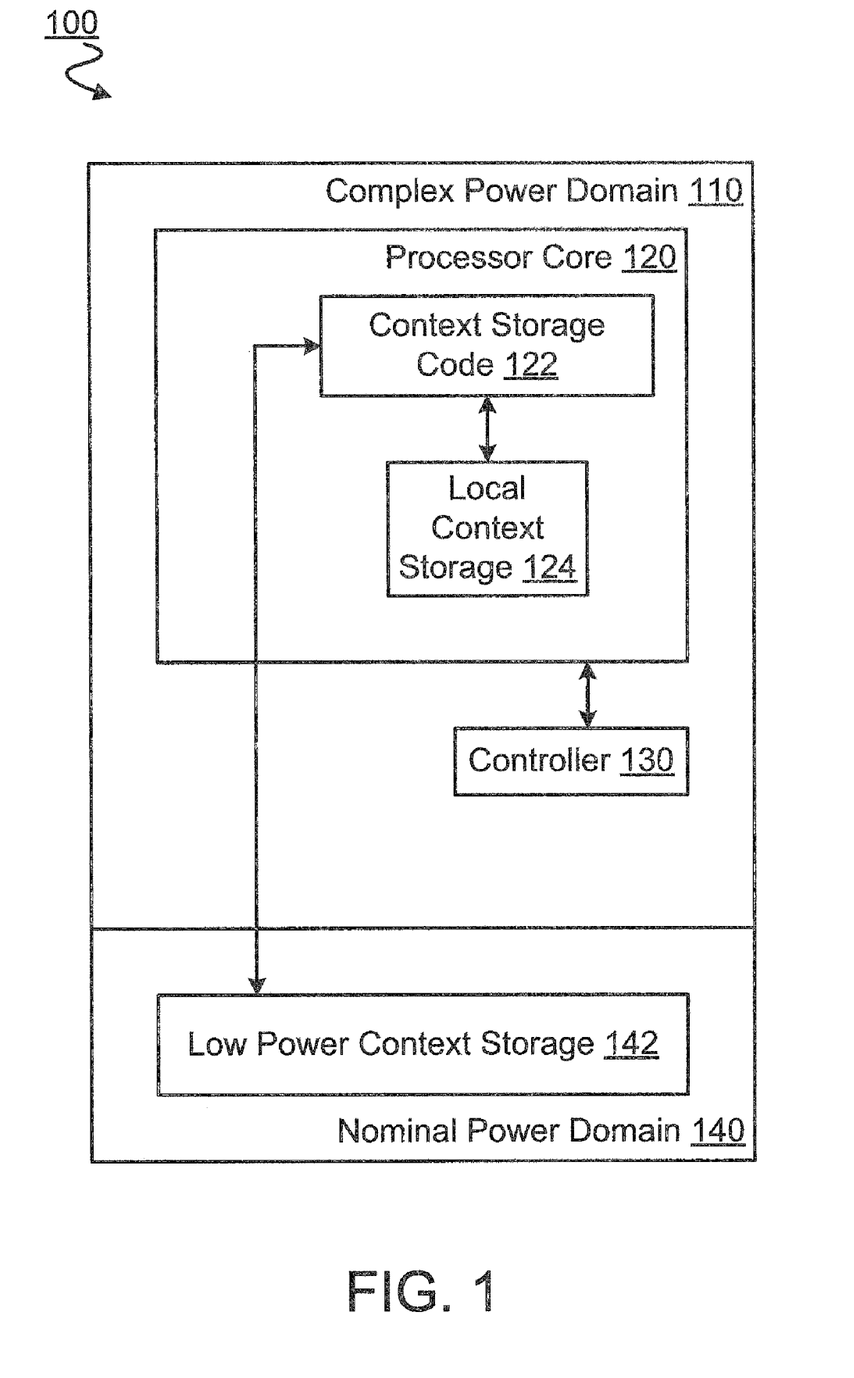
FIG. 1 is a block diagram illustrating select elements of a system to access processor context information according to an embodiment.

FIG. 1 illustrates select elements of a system 100 to store processor context information according to an embodiment. System 100 may include a processing device, such as a CPU, having at least one processor core 120. The processor core 120 may reside in a complex power domain 110—i.e. a group of one or more hardware components and/or devices capable of variously operating in different power states. As used herein, "power state" refers to a condition of a power domain for achieving a performance which exhibits a particular power characteristic—e.g. one or more levels and/or types of power consumption. In an embodiment, a plurality of power states of complex power domain 110 may include providing various respective supply voltage levels to processor core 120.

The plurality of power states of complex power domain 110 may include successive power states whereby power consumption by processor core 120 may be incrementally increased/reduced. For example, hardware devices and/or components communicating with processor core 120 from within complex power domain 110 may be successively turned off or otherwise powered down—e.g. to incrementally reduce the processing load on processor core 120. Alternatively or in addition, some or all of the circuit logic within processor core 120 may be selectively turned off or otherwise powered down to reduce power consumption. In an embodiment, a relatively lower power consumption state of a plurality of power states in complex power domain 110 may represent a standby mode in which processing core 120 is completely powered down.

In an embodiment, system 100 may include a nominal power domain 140 separate from complex power domain 110. Nominal power domain 140 may include its own power state demonstrating some power characteristic which is consistent during various power states of one or more other power domains in system 100. For example, a low power (LP) context storage 142 in nominal power state 140 may be provided with or otherwise maintain at least some minimal supply voltage level or levels during a plurality of power states of complex power domain 110. In an embodiment, the power state of nominal power domain 140 may be a precondition for a plurality of various power states of complex power domain 110.

By providing a consistent power characteristic, a power state of nominal power domain 140 may support an "always-on" mode of operation in system 100. For example, LP context storage 142 of nominal power domain 140 may be kept powered on and available in order to support another domain—e.g. complex power domain 110—as it variously transitions into and/or out of its respective power states. More particularly, LP context storage 142 may be kept available for the storing and/or recovering context information for processor core 120. As used herein, "context information" refers to information describing a state of operation at a particular time. Context information may represent all, or only a portion of, the state (or context) of a data processing system. For example, context information of processor core 120 may describe one or more conditions of processor core 120—e.g. at a time just before it entered a particular power state.

Processor core 120 may use its own context storage code 122 to direct a storing of certain of its context information in a local context storage 124. Moreover, context information of processor core 120 may be stored remotely in low power (LP) context storage 142. LP context storage 142 be may considered "low power" at least insofar as storage of context information in LP context storage 142 provides a relative power saving advantage over some alternative which maintains a level of power to processing core 120 for the purpose of preserving context stored in local context storage 124. A controller 130 in complex power domain 110 may assist context storage code 122 in accessing LP context storage 142 to store and/or retrieve context information for power state transitions which are associated with processor core 120 being powered down.

Saving and/or retrieving context information of processor core 120 may include accessing a local context storage 124 within processor core 120. In an embodiment, saving and/or retrieving context information of processor core 120 may be at least partially directed by a controller 130 of system 110. For example, controller 130 may provide communications to context storage code 122 indicating when context information of processor core 120 is to be saved to and/or retrieved from LP context storage 142 of the nominal power domain 140.

Figure 2:
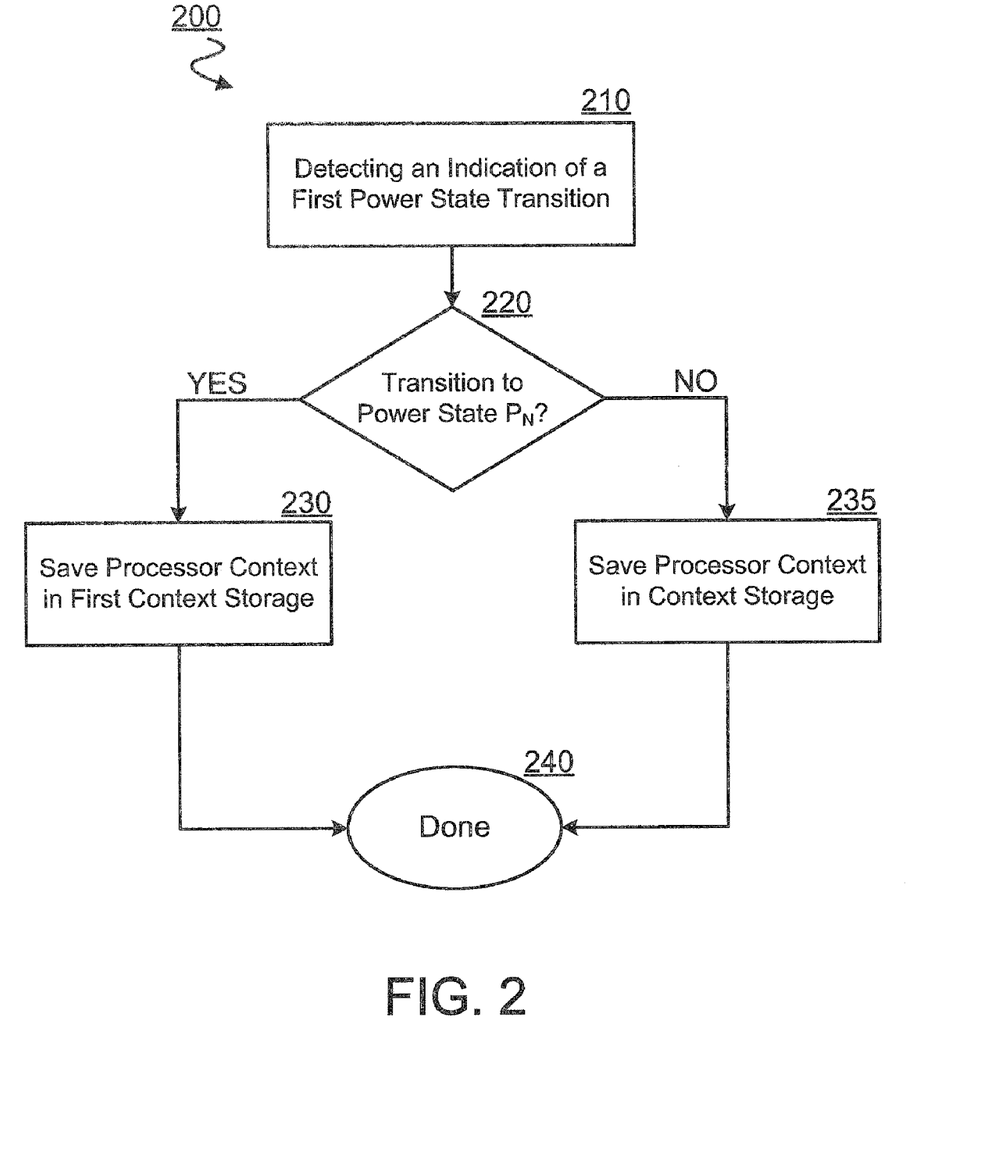
FIG. 2 is a sequence diagram illustrating select elements of a method for storing processor context information according to an embodiment.

FIG. 2 illustrates select elements of a method 200 for saving processor context information, according to an embodiment. Method 200 may be performed by system 100, for example. Method 200 may include detecting, at 210, an indication of a power state transition. For example, power management hardware and/or software of system 100 (not shown) may detect a drop in a processing load, a loss of an access point to a network and/or some other event indicating that system 100 can avail of an opportunity to decrease power consumption. Alternatively or in addition, context storage code 122 may detect a trigger message based on such an event being detected, the message directing the context storage code 122 to initiate a storing of processor context information.

In response to detecting the indication, a determination may be made, at 220, as to whether the power state transition which is indicated includes a transition to a particular power state $P_N$ of the plurality of power states. For example, context storage code 122 and/or controller 130 may query power management means of system 100 to identify whether (or not) complex power domain 110 is to transition to power state $P_N$. In an embodiment, power state $P_N$ includes a state in which a processor core—e.g. processor core 120—is powered down.

If a determination is made that the power state transition does include the transition to power state $P_N$, then certain processor context information may be saved in a first context storage. The first context storage may include, for example, LP context storage 142. In an embodiment, context information of processor core 120 may be stored directly to LP context storage 142. Alternatively, context information of processor core 120 may first be stored to local context storage 124 and then copied from local context storage 124 to LP context storage 142. Initially storing context information to local context storage 124 before copying to LP context storage 142 may reduce the need to maintain distinct yet functionally duplicative messaging and/or instructions for corresponding context storage operations.

If a determination is made that the power state transition does not include the transition to power state $P_N$, then the processor context information may be saved in a second context storage, at 235. In an embodiment, this second context storage may be the local context storage 124. It is understood that an alternative result (not shown) of the determining at 220 may be that no context information needs to be stored. After any storing of processor context information is done, system 100 may continue, at 240, as necessary to complete the power state transition.

Figure 3:
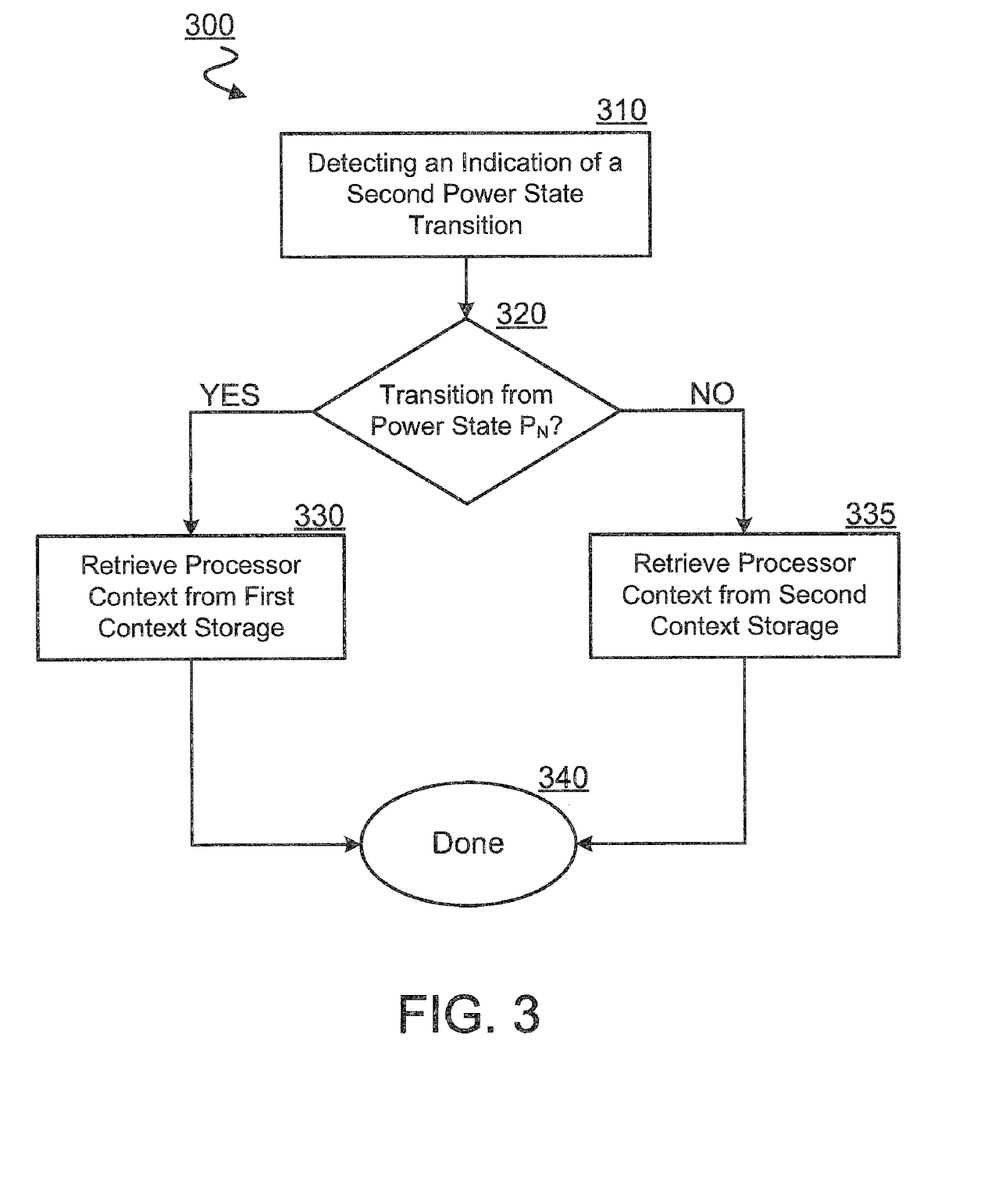
FIG. 3 is a sequence diagram illustrating select elements of a method to retrieving processor context information according to an embodiment.

FIG. 3 illustrates select elements of a method 300 for retrieving processor context information, according to an embodiment. Method 300 may be performed by system 100, for example. Method 300 may include detecting, at 310, an indication of a power state transition. For example, power management hardware and/or software of system 100 (not shown) may detect an actual or expected increase in a processing load, a newly available network access point and/or some other event indicating that system 100 may be required to increase power consumption. Alternatively or in addition, context storage code 122 may detect a trigger message based on such an event being detected, the message directing the context storage code 122 to initiate a retrieval of stored processor context information.

In response to detecting the indication, a determination may be made, at 320, as to whether the power state transition which is indicated includes a transition from a particular power state $P_N$ of the plurality of power states. For example, context storage code 122 and/or controller 130 may query power management means of system 100 to identify whether (or not) complex power domain 110 is to transition from power state $P_N$. In an embodiment, power state $P_N$ may include a state in which a processor core is powered down.

If a determination is made that the power state transition does include the transition from power state $P_N$, then processor context information may be retrieved from a first context storage, at 330. The first context storage may include, for example, LP context storage 142. In an embodiment, context information of processor core 120 may be retrieved directly from LP context storage 142. Alternatively, context information of processor core 120 may first be copied to local context storage 124 from LP context storage 142 before processor state is restored based on the context information copied to local context storage 124.

If a determination is made that the power state transition does not include the transition to power state $P_N$, then the processor context information may be retrieved from a second context storage, at 335. In an embodiment, this second context storage may be the local context storage 124. It is understood that an alternative result (not shown) of the determining at 320 may be that no context information needs to be retrieved. After the storage of the processor context is done, at 340, system 100 may continue as necessary to complete the power state transition.

Figure 4:
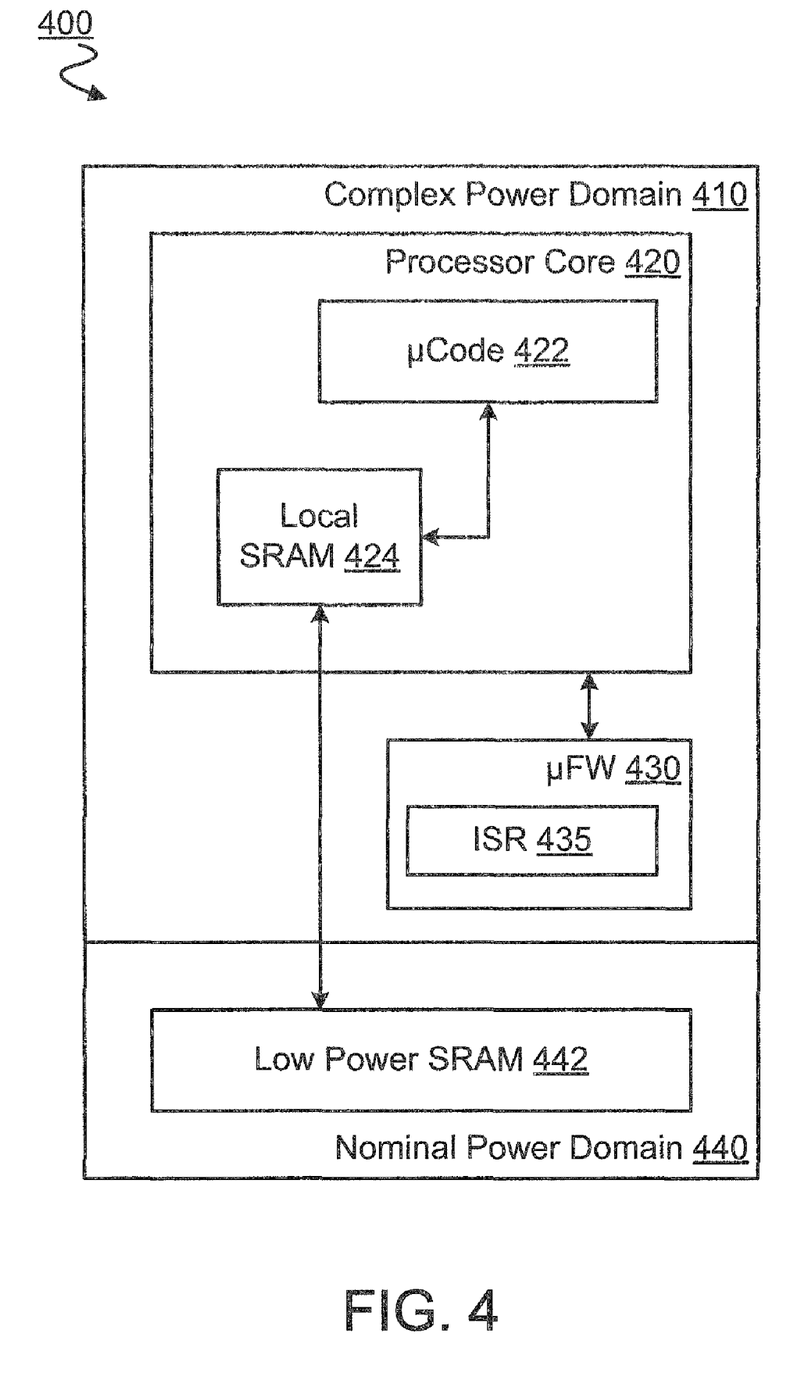
FIG. 4 is a block diagram illustrating select elements of a system to access processor context information according to an embodiment.

FIG. 4 illustrates select elements of a system 400 to store processor context information according to an embodiment. System 400 may include at least some features discussed herein with respect to system 100. System 400 may implement a plurality of power states within a complex power domain 410 which includes a processing device having at least one processor core 420. Processor core 420 may include microcode (μCode) 422 to store certain context information of processor core 424 to a local context storage—e.g. local SRAM 424. System 400 may further include micro-firmware (μFW) 430—e.g. external to processor core 430—to provide control instructions which augment the context saving capabilities of μCode 422.

The complex power domain 410 may be distinguished from a nominal power domain 440 of system 400. The nominal power domain 440 may include one or more hardware devices and/or components which are provided with or otherwise maintain some consistent power characteristic during each of a plurality of power states in the complex power domain 410. By way of illustration and not limitation, a low power SRAM 442 of nominal power domain 440 may be provided with at least some minimal voltage supply level as a condition for complex power domain 410 to implement and/ or variously transition between a plurality of power states. The at least minimal power supply maintains an availability of low power SRAM 442 to store context information of processor core 420—e.g. for transitions of complex power domain 410 into and/or out of a power state in which processor core 420 is completely powered down.

System 400 may provide selective storing of context information for processor core 420 to local SRAM 424 and/or low power SRAM 442, where the destination(s) to which the context information is stored is determined based at least in part on identifying a power state to which (or from which) complex power domain 410 is transitioning. System 400 may store information—e.g. in an implementation-specific register (ISR) 435—indicating that context information of processor core 420 is to be stored—or has been stored—in a particular combination of local SRAM 424 and/or low power SRAM 442. The µFW 430 may access ISR 435 to determine whether or how context storing or retrieving by µCode 422 is to account for a storing of context in low power SRAM 440.

Figure 5A:
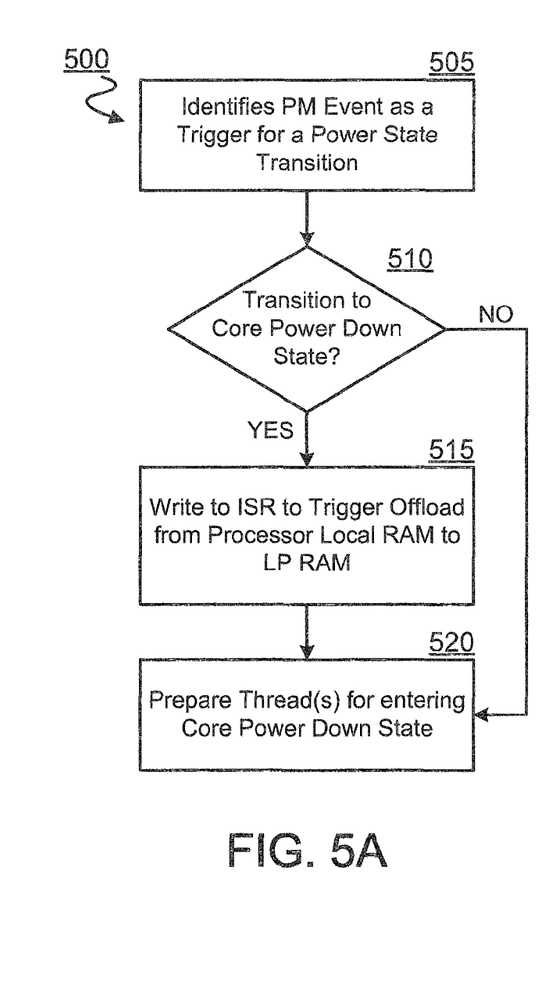
FIG. 5A is a sequence diagram illustrating select elements of a method for storing processor context information according to an embodiment.

FIG. 5A illustrates select elements of a method 500 to store processor context information according to an embodiment. In various embodiments, method 500 may be performed in a system including features of system 100 and/or system 400. In method 500, a power management (PM) event may be identified, at 505, as being a trigger for a power state transition. In response to the identifying the PM event, a determination may be made, at 510, as to whether the triggered power state transition includes transitioning to a power state in which a processor core is powered down. The processor core may reside in a complex power domain implementing a plurality of power states including at least one power state in which the processor core is powered down. The complex power domain of the processor core may be distinguished from a nominal power domain in which a low power (LP) RAM is kept available to store context information of the processor core.

If it is determined that the triggered power state transition is to power down the processor core, then information may be stored, at 515, indicating a storing of context information for the processor core in the LP RAM. In an embodiment, an ISR or similar data storage means will store such information to serve as a trigger so that code responsible for storing such context information will branch to perform an execution flow which stores the context information to the LP RAM. In an embodiment, the storing of processor core context information to the LP RAM may include storing the processor core context information to a local RAM of the processor core and then offloading a copy of the stored context information from the local RAM to the LP RAM of the nominal power domain. It is understood that in various alternate embodiments, the processor core context information may be save directly saved to the LP RAM—e.g. without accessing the local RAM of the processor core.

If the triggered power state transition is determined to not power down the processor core, the storing of trigger information in 515 may be bypassed, and method 500 may continue with other operations, at 520, to prepare one or more execution threads for a powering down of the processor core. In various embodiments, context information may include information describing the state of one or more threads running on a processor core.

Figure 5B:
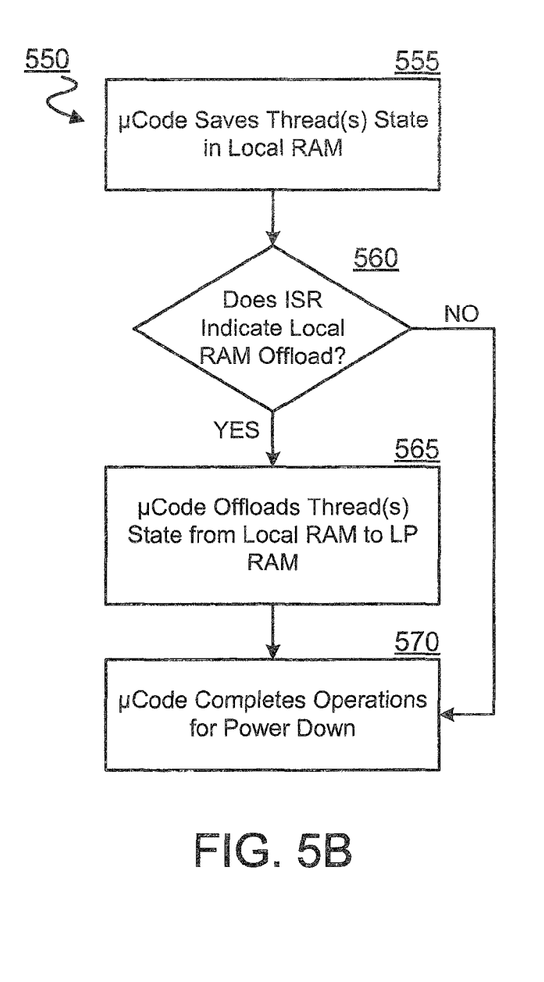
FIG. 5B is a sequence diagram illustrating select elements of a method for storing processor context information according to an embodiment.

FIG. 5B illustrates select elements of a method 550 to store processor context information according to an embodiment. Method 550 may be performed in a system including features discussed herein with respect to system 100 and system 400, for example. In an embodiment, method 550 may be performed after operations of method 500. At 555, context storing code such as µCode 422 may save processor context information—e.g. a current state of one or more threads executing in a processor core—to a local RAM of that processor core. The processor core may reside in a complex power domain implementing a plurality of power states including at least one power state in which the processor core is powered down. The complex power domain of the processor core may be distinguished from a nominal power domain in which a low power (LP) RAM is kept available to store context information of the processor core.

An evaluation may be made at 560—e.g. by the µCode of the processor core or by external control code supporting the µCode—as to whether (or not) an ISR or similar repository indicates that the stored processor context information is to be offloaded from local RAM. If so, then the µCode offloads the thread state(s) or other processor context information to the LP RAM, at 565. If offloading from the local RAM is not indicated, then the µCode foregoes writing the context information to the LP RAM, and continues with other operations to complete the power down of the processor core.

Figure 6:
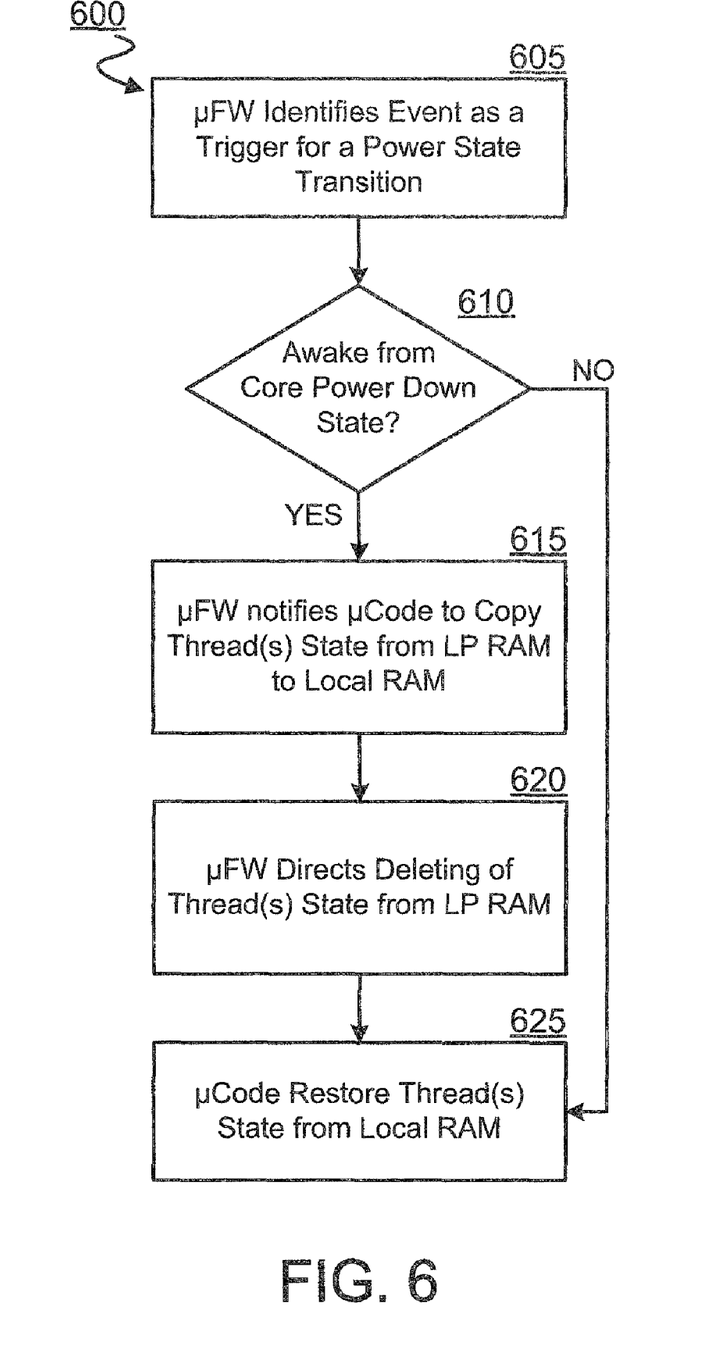
FIG. 6 is a sequence diagram illustrating select elements of a method for retrieving processor context information according to an embodiment.

FIG. 6 illustrates select elements of a method 600 for retrieving processor context information according to an embodiment. Method 600 may be performed in a system including features discussed herein with respect to system 100 and system 400, for example. In an embodiment, method 600 is to retrieve context information stored by either or both of methods 500 and 550.

At 605, controller means such as µFW may identify an event as a trigger for a power state transition. In response to the identifying the event, a determination may be made, at 610, as to whether the triggered power state transition includes awaking from a power state in which a processor core is powered down. The processor core may reside in a complex power domain implementing a plurality of power states. The complex power domain of the processor core may be distinguished from a nominal power domain in which a low power (LP) RAM is kept available to store context information of the processor core.

If it is determined that the power state transition is to awaken the processor core from being powered down, then at 615, controlling code such as µFW may notify context storage µCode of the processor core to copy the thread state(s) or other processor context information from the LP RAM to a local RAM of the processor core. After the processor context information is copied to the local RAM, the µFW may direct a deleting of the processor context information from the LP RAM, at 620. The µCode may restore the state of thread(s) in the processor core from the context information copied to local RAM, at 620. If it is determined that the power state transition is not to awaken the processor core from being powered down, then the restoring of thread state at 620 may be performed without the accessing of the LP RAM at 615 or 620.

Techniques and architectures for processor operation are described herein. In the above description, for purposes of explanation, numerous specific details are set forth in order to provide a thorough understanding of embodiments of the invention. It will be apparent, however, to one skilled in the art that embodiments of the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of embodiments of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of embodiments of the invention should be measured solely by reference to the claims that follow.

What is claimed is:

1. A method comprising:
  detecting an indication of a first power state transition of a first power domain including a processor core;
  in response to the detecting the indication of the first power state transition, sending from the processor core to power management logic a query for determining whether the first power state transition includes a transition to a first power state of a plurality of power states of the first power domain; and
  in response to determining that the first power state transition of the processor core is to include the transition to the first power state, saving a context information of the processor core in a first context storage external to the first power domain, otherwise, saving the context information of the processor core in a second context storage within the processor core.

2. The method of claim 1, wherein the first power state includes a state in which the processor core is powered down.

3. The method of claim 1, wherein the first context storage and the second context storage include a static random access memory (SRAM).

4. The method of claim 1, wherein saving the context information of the processor core in the first context storage includes:
  saving the context information of the processor core to the second context storage, and
  copying the context information saved in the second context storage to the first context storage.

5. The method of claim 1, wherein saving the context information of the processor core in the first context storage includes saving without accessing the second context storage.

6. The method of claim 1, wherein the first context storage is in a second power domain separate from the first power domain, wherein a power state of the second power domain includes a power characteristic maintained during each of the plurality of power states of the first power domain.

7. The method of claim 6, wherein the power characteristic includes the first context storage being provided at least a first supply voltage level.

8. The method of claim 1, further comprising
  detecting an indication of a second power state transition of the first power domain, the second power state transition subsequent to the first power state transition;
  in response to the detecting the indication of the second power state transition, determining whether the second power state transition includes a transition from the first power state; and
  if the second power state transition is determined to include the transition from the first power state, then
    retrieving the context information of the processor core from the first context storage, else
  if the second power state transition is determined to not include the transition from the first power state, then
    retrieving the context information of the processor core from the second context storage.

9. A system comprising:
  a processor device including a processor core having a first context storage, the processor core to detect an indication of a power state transition of a first power domain including the processor device, the processor core further to send a query from the processor core to power management logic in response to the detecting the indication of the power state transition, the query to determine whether the power state transition includes a transition to a first power state of a plurality of power states of the first power domain; and a second context storage device coupled to the processor device and external to the first power domain;

wherein the processor core to save context information of the processor core in the second context storage in response to determining that the power state transition of the processor core includes the transition to the first power state, otherwise, the processor core to save the context information of the processor core in the first context storage.

10. The system of claim 9, wherein the first power state includes a state in which the processor core is powered down.

11. The system of claim 9, wherein the first context storage and the second context storage include a static random access memory (RAM).

12. The system of claim 9, wherein the processor core to save the context information of the processor core in the second context storage includes:
  the processor core to save the context information of the processor core to the first context storage, and
  the processor core to copy the context information saved in the second context storage to the first context storage.

13. The system of claim 9, wherein the second context storage is in a second power domain separate from the first power domain, wherein a power state of the second power domain maintains a power characteristic during each of the plurality of power states plurality of power states of the first power domain.

14. An apparatus comprising:
  a processor core having a first context storage, the processor core to detect an indication of a power state transition of a first power domain including the processor core, the processor core further to send a query from the processor core to power management logic in response to the detecting the indication of the power state transition, the query to determine whether the power state transition includes a transition to a first power state of a plurality of power states of the first power domain;
  wherein a second context storage is coupled to the processor core and external to the first power domain;

wherein the processor core to save context information of the processor core in the second context storage in response to determining that the power state transition of the processor core includes the transition to the first power state, otherwise, the processor core to save the context information of the processor core in the first context storage.

15. The apparatus of claim 14, wherein the first power state includes a state in which the processor core is powered down.

16. The apparatus of claim 14, wherein the first context storage and the second context storage include a static random access memory (RAM).

17. The apparatus of claim 14, wherein the processor core to save the context information of the processor core in the second context storage includes:
  the processor core to save the context information of the processor core to the first context storage, and
  the processor core to copy the context information saved in the second context storage to the first context storage.

18. The apparatus of claim 14, wherein the second context storage is in a second power domain separate from the first power domain, wherein a power state of the second power domain provides a power characteristic during each of the plurality of power states plurality of power states of the first power domain.

* * * * *